July 9, 1940.  W. R. WEBSTER  2,206,930
CONTINUOUS MOLDING MACHINE
Filed July 29, 1938  3 Sheets-Sheet 1
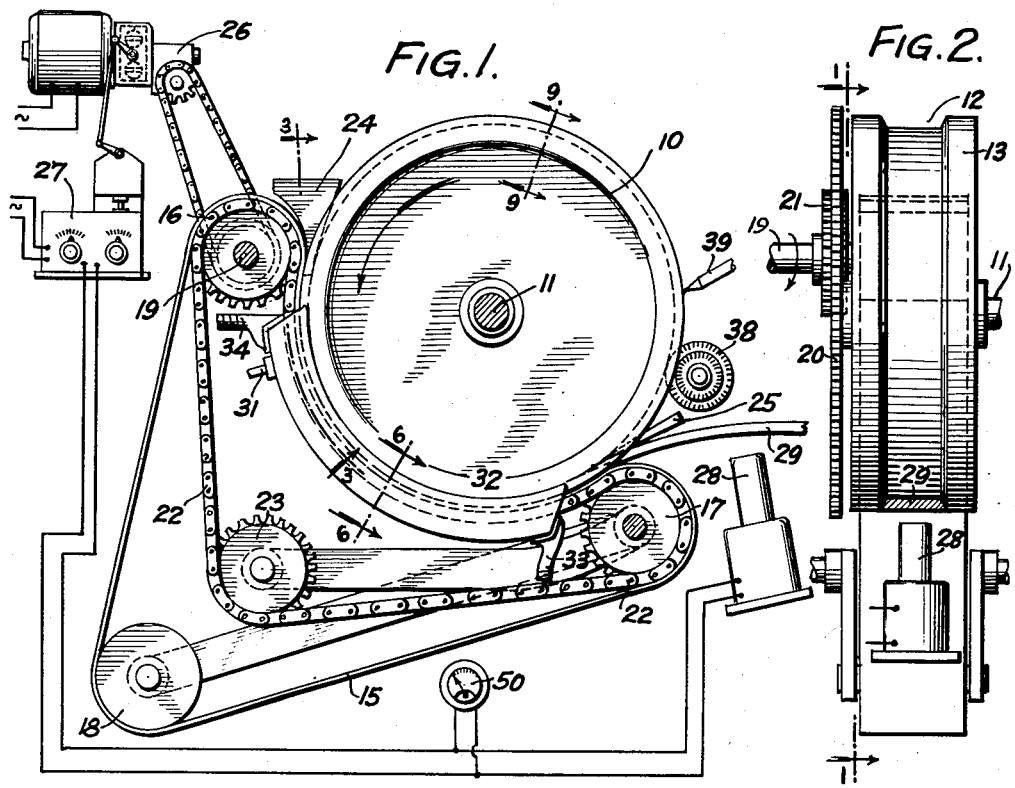
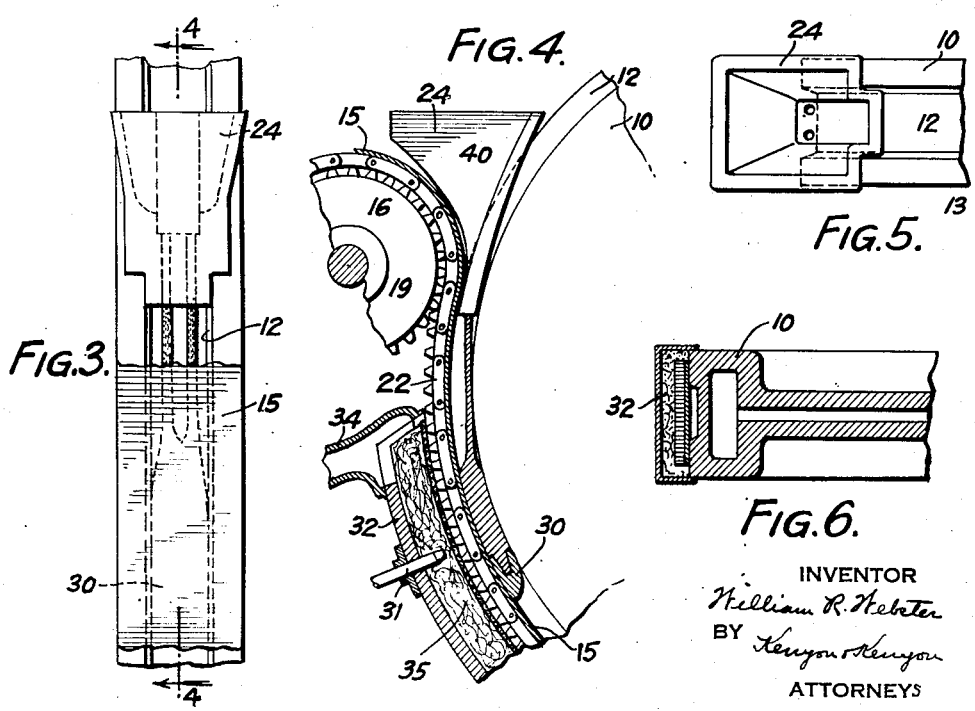
INVENTOR
William R. Webster
BY Kenyon & Kenyon
ATTORNEYS July 9, 1940.　　　　W. R. WEBSTER　　　　2,206,930
CONTINUOUS MOLDING MACHINE
Filed July 29, 1938　　　3 Sheets-Sheet 2
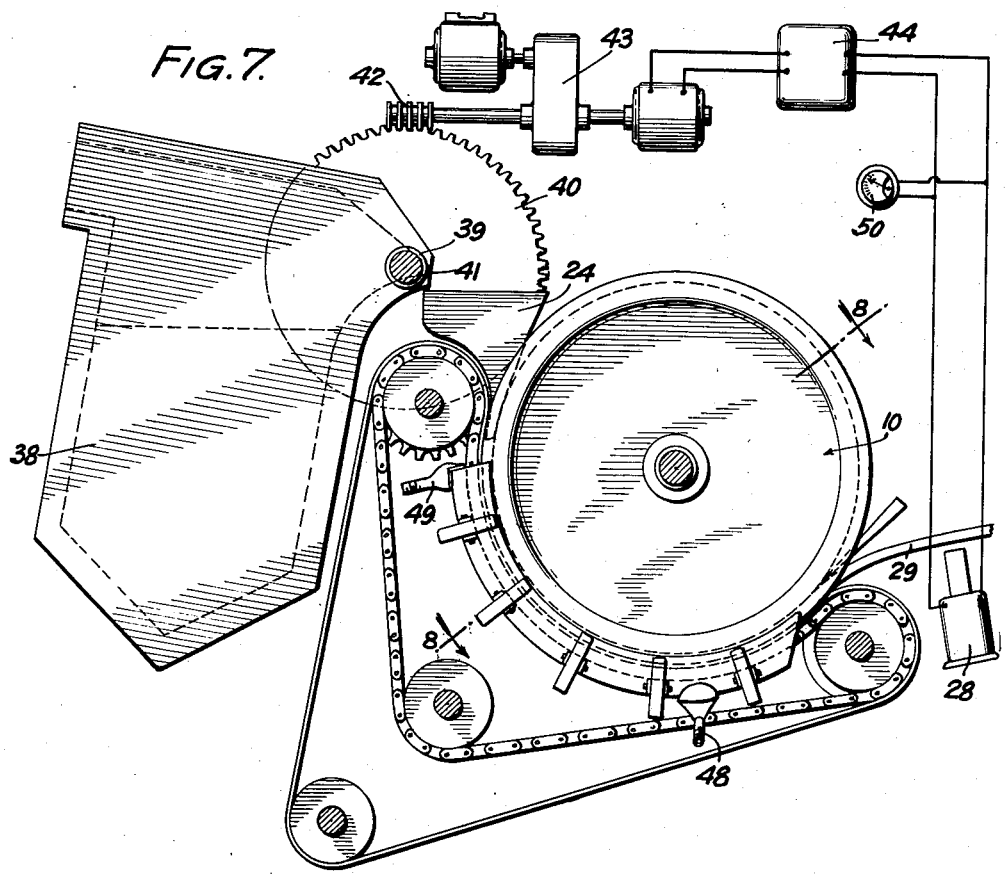
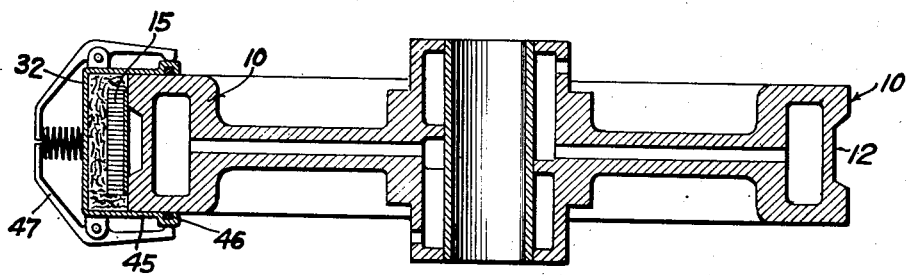
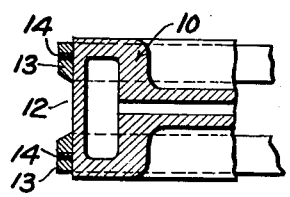
INVENTOR
William R. Webster
BY Kenyon & Kenyon
ATTORNEYS July 9, 1940.  W. R. WEBSTER  2,206,930
CONTINUOUS MOLDING MACHINE
Filed July 29, 1938  3 Sheets-Sheet 3

INVENTOR
William R. Webster
BY Kenyon & Kenyon
ATTORNEYS.

Patented July 9, 1940

2,206,930

UNITED STATES PATENT OFFICE 2,206,930

CONTINUOUS MOLDING MACHINE

William R. Webster, Bridgeport, Conn.

Application July 29, 1938, Serial No. 221,925

4 Claims. (Cl. 22—57.3)

This invention relates to continuous molding machines and more especially to machines for molding long bars or rods of non-ferrous metal.

Heretofore, continuous molding machines have not been satisfactory due to the lack of uniformity in the molded rods or bars. The lack of uniformity has been due to the absence of means for controlling the relation of the feed rate of the molten metal to the discharge rate of the molded bar or rod. If the molded rod or bar is discharged at too low a rate, the molten metal overflows the mold and if the discharge rate is too great, then liquid metal is discharged instead of solidified metal.

An object of this invention is to provide a continuous molding machine in which the relation between the feed rate of molten metal and the discharge rate of the molded bar or rod is so controlled that uniformity is obtained.

A machine embodying the invention comprises an endless member, preferably a rotating wheel, having a peripheral channel in combination with a metal band which co-operates with the channel over a portion of its length to constitute a cover therefor. Means are provided to introduce molten metal at one end of the covered portion of the channel and means are provided to insure solidification of the metal at a selected point in the molding channel. The first of such means is responsive to the temperature of the solid bar emerging from the other end of said covered portion and regulates the relation between the rate of feed of the molten metal and rotational speed of the wheel. Should the temperature of the emerging bar tend to increase, the temperature-responsive device causes slower movement of the wheel or faster rate of feed of molten metal and if the temperature of the emerging bar tends to decrease, then the temperature-responsive means causes faster rotation of the wheel or slower rate of feed of molten metal. Backup of the metal in the channel with consequent overflow is thus prevented as well as the possibility of the metal emerging from the channel in fluid form.

Other objects, novel features and advantages of this invention will become apparent from the following specification and accompanying drawings, wherein:

Fig. 1 is an elevation substantially on the line 1—1 of Fig. 2 of an apparatus embodying the invention, certain parts being shown schematically;

Fig. 2 is a fragmentary end view;

Fig. 3 is a section substantially on the line 3—3 of Fig. 1;

Fig. 4 is a fragmentary enlarged section substantially on the line 4—4 of Fig. 3;

Fig. 5 is a fragmentary plan view;

Fig. 6 is a fragmentary section on the line 6—6 of Fig. 1;

Fig. 7 is an elevation of a modified form of apparatus;

Fig. 8 is a section on the line 8—8 of Fig. 7;

Fig. 9 is a fragmentary section on the line 9—9 of Fig. 1;

Figure 10:
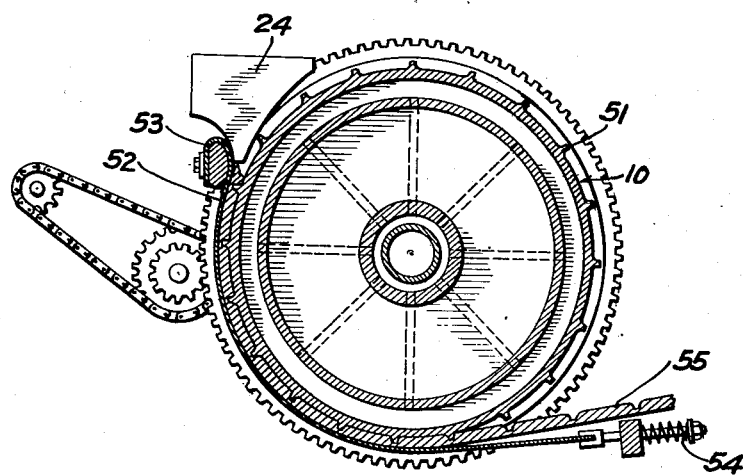
Figs. 10 and 11 are vertical sections of modified forms of apparatus.

A molding wheel 10 is carried by the shaft 11 and is provided with a peripheral channel 12. As shown in Fig. 2, the channel 12 is defined by ribs 13 which may be integral with the wheel 10 or as shown in Fig. 9 may be adjustable axially of the wheel to vary the width of the channel. Set screws 14 are provided for fixing the adjustable ribs in desired position, these set screws preferably being of the hollow hexagonal type. Over a portion of its length, the channel 12 is closed by an endless metal band 15 which passes around guide rollers 16 and 17 and tensioning idler 18. The roller 16 is fixed to a shaft 19 and on the shafts 11 and 19 are provided gears 20 and 21 for effecting synchronous movement of the wheel 10 and band 15. The band 15 preferably is reinforced by a link chain 22 of the Morse silent type, the chain being interposed between the band and each of the rollers 16 and 17 which are provided with suitable teeth to co-operate with the chain links, the chain also passing around a tensioning roller 23. A pouring box or strainer 24 is supported adjacent the upper point of contact of the band with the wheel and has a nozzle portion extending toward the covered portion of the channel. A stripper 25 is provided for stripping the finished bar from the wheel.

The shaft 19 is connected through suitable driving mechanism with a variable speed power transmitter 26 which is controlled by a suitable balancing device 27 such, for example, as one commonly known in the industry as a "Micromax electric control" which is a sensitive balance for regulating the output in proportion to demand and usually comprises an electric controller unit and a relay detector unit which in the drawings are illustrated diagrammatically. A temperature responsive device such as a radiation pyrometer 28 of well-known type and construction is arranged to be influenced by the temperature of the metal bar 29 as it leaves the molding wheel 10. The pyrometer is properly connected to the balancing device 27, so that upon increase in temperature of the bar 29, the rotational speed of the wheel 10 is decreased and upon decrease in temperature of the bar 29, the rotational speed of the wheel 10 is increased.

Molten metal is supplied to the strainer 24 and is fed in two or more streams through suitable outlet ports in the strainer into the upper end of the covered portion of the channel 12 as clearly shown in Fig. 4. Rotation of the wheel 10 carries the metal to the end of the covered portion of the channel and by the time such end is reached, the metal has solidified sufficiently to permit its withdrawal from the channel. To assist in starting the molding operation, a plug 30 is arranged in the channel, this plug having a frictional fit and the wheel 10 is rotated to bring the plug into substantially the position shown in Fig. 4. This plug acts as a dam to prevent free escape of the metal when first poured into the channel. As the wheel 10 is rotated during the molding operation, the plug 30 moves along until it engages the stripper 25 whereupon it leads the molded bar out of the channel.

To promote solidification of the metal in the covered portion of the channel, nozzles 31 are provided for directing water jets against the back of the band 15 and the chain 22. A pan 32 is provided for catching the water as it drips off the band and conveying the water to a suitable point of disposal. A drain 33 is provided at the bottom of the pan 32 for the normal escape of water therefrom and an emergency outlet 34 is provided at the upper end of the pan. In the pan is provided a filling 35 of steel wool or the like which serves to sub-divide the body of water in the pan into small masses.

By experiment it is determined the temperature at which the bar 29 should emerge from the molding channel to insure solidification at the proper point in the molding channel and the pyrometer 28 is set accordingly. Any change in the temperature of the emerging bar results in correction by the pyrometer, the balancing device 27 and the variable speed power transmitter 26 of the rotational speed of the wheel 10 to reestablish the proper condition. In the absence of such regulation, too slow rotation of the wheel 10 would result in overflow of molten metal at the top of the molding channel and too great speed would result in molten metal flowing out at the lower end of the channel. However, with the control apparatus herein disclosed, the bar emerges from the molding channel always at the proper temperature and uniformity is insured.

A brush wheel 38 is provided for cleaning the channel 12 and a jet 39 is provided for applying suitable dressing to the groove. Also, means (not shown) are provided for introducing molten metal into the pouring box or strainer 24. The variable speed power transmitter may be of the same construction as illustrated in co-pending application, Serial No. 146,153.

In the modification illustrated in Figs. 7 and 8, an adjustable furnace 38 of the standard induction type is supported by the shaft 39 which carries the worm wheel 40. The nozzle 41 of the furnace is arranged to discharge into the strainer or pouring box 24. A worm wheel 42 meshes with the gear 40 and is driven by variable speed means indicated generally at 43 which are regulated by the pyrometer 28. The variable speed means 43 is designed to cause rotation of the worm wheel 42 at a faster or slower speed, depending upon the temperature of the bar 29 emerging from the channel in the molding wheel 10. As the temperature of the bar 29 increases, the rotational speed of the worm 42 is increased to tilt the furnace 38 to increase the rate of flow of the molten metal into the covered portion of the wheel 10 and thus cause a rise in the level of the molten metal in such covered portion with consequent solidification at a higher point, thus reducing the temperature of the emerging bar. In the event of a decrease in temperature of the emerging bar 29, the speed rate of the worm 42 is decreased with the reverse effect on the temperature of the bar 29. A suitable relay or the like 44 is interposed between the pyrometer 28 and the control device 43 to enable the pyrometer accurately to control the operation of the device 43.

In this modification, an arrangement is provided by which the band 15 and chain 22 may be flooded with cooling liquid. The pan 32 has its sides 45 overlapping the rim of the wheel 10 and the sides are provided at their edges with offsets in which are arranged gaskets 46. The pan 32 is made of very light material for a reason subsequently to be explained and to insure a substantially water-tight seal, spring-pressed brackets 47 are provided to hold the gaskets 34 against the sides of the wheel 10. The lower end of the pan 32 continues far enough around the bottom of the wheel 10 to have the edge of the pan above the lowest point of the band 15, there being provided a drain 48 at the lowermost point of the pan and an emergency drain 49 at the upper end of the pan. With this arrangement, the pan 32 may be sufficiently filled with water that the chain and band are substantially submerged without any possibility of water escaping through the opening by which the band and chain leave the pan. In both modifications, the pan 32 is made of light material and steel wool is provided for the purpose of preventing injury to the operators in the event that hot metal comes into contact with the water in the pan due to escape of the metal around the band or because of breakage of the band. In such event, the light material would yield immediately, thus reducing the force of any explosion and the filling serves to reduce the continuous mass of water. Either form of pan 32 may be used in either modification.

In both modifications, the wheel 10 may be provided with channels as shown in Fig. 8 for circulating cooling liquid through the medium of the wheel in back of the molding channel. Also, a temperature indicator 50 may be provided in combination with the pyrometer 28 so that in the event that the automatic means gets out of order, the rotational speed of the wheel 10 or the tilting movement of the furnace 38 may be adjusted manually to maintain the emerging bar 29 at the desired temperature.

Figure 11:
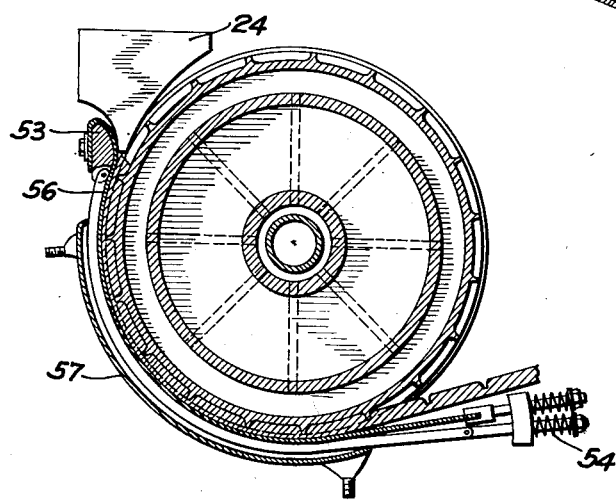

In Figs. 10 and 11 are illustrated modified forms of the apparatus for producing a product in partially discontinuous masses such as ingots. The channel of the wheel 10 is provided with transverse dams 51 at regularly spaced intervals, these dams being of less than the full depth of the groove to allow metal to flow from one cavity to the other. In these modifications, the traveling band of the previous modification is replaced by a stationary band 52 having one end attached to a rigid support 53 and the other end attached to a resilient support 54 which pulls the band into contact with the surface of the wheel over a portion of its circumference. Molten metal from the pouring box or strainer is introduced into the upper end of the closed portion of the channel as previously described and the solidified product 55 is discharged from the lower end. As shown in Fig. 11, a reinforcing chain 56 may be used in connection with the band 52 in which event only the upper end of the band is fastened to a support. The chain is fastened to the rigid support 53 and its lower end is attached to the resilient support 54 and the chain holds the band in contact with the surface of the wheel. Suitable means 57 are provided for contacting cooling medium with the band and chain as previously described. Also, the same means for controlling either the speed of rotation of the wheel or the rate of pouring of metal may be used with this wheel, although these devices are not shown for the sake of clearness.

Figure 12:
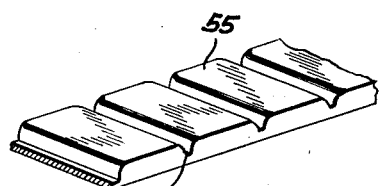
Fig. 12 is a fragmentary perspective view of the product obtained from such modifications.

As illustrated in Fig. 12, the product comprises a bar of metal 55 having indentations 58 dividing it into ingots or the like. In some instances, the ingots will be discharged from the apparatus in separated form since due to shrinkage of the metal as it cools, such separation is effected automatically. In the event that the product is a continuous bar, it may be easily broken into the individual ingots.

The apparatus illustrated in Figs. 10 and 11 may be used for producing strip metal which is to be further reduced in thickness as by rolling. In such event, the dams are made of slight height relative to the depth of the groove and their function is to cause the strip to advance with the movement of the groove. In some cases, particularly such as when hot rollable mixtures are being cast, a pair of reducing rolls may be placed in tandem with the wheel, such rolls being operated by variable speed means controlled by the thermostat. Where pouring control is employed, control of the speed of the rolls is unnecessary. In place of dams, transverse grooves in the bottom of the matrix channel may be used and in such event, it is desirable to place a milling cutter in tandem with the wheel to mill off the protuberances due to the transverse grooves. Grooves or protuberances in the sides of the matrix channel may be employed for the same purpose. Where hot short mixtures are used, cold rolls may be substituted for the hot rolls or milling cutter and cooling members such as a water spray may be introduced between the wheel and the rolls.

It is of course understood that various modifications may be made in the device above described without in any way departing from the spirit of the invention as defined in the appended claims and that instead of a wheel mold other types of endless channel molds may be used.

I claim:

1. A continuous molding apparatus comprising a rotatable wheel having a peripheral channel, driving means for said wheel, means movable in synchronism with said wheel over a portion of its rotation to constitute a cover for said channel, means to feed molten metal into one end of the covered portion of said channel, and means responsive to temperature increase of the solid bar emerging from the end of said covered portion to increase the rate of feed of the molten metal and responsive to temperature decrease of said bar to decrease the rate of feed of said molten metal.

2. A continuous molding apparatus comprising a movable endless member having a peripheral channel, means forming a cover for said channel over a portion of its length, means for effecting continuous movement of said endless member, means for continuously introducing molten metal into one end of the covered portion of said channel, means for facilitating solidification of the molten metal while in said channel, and temperature sensitive means responsive to temperature increase of the solid bar emerging from the covered portion of said channel to increase the ratio of the metal flow rate to the peripheral speed of said endless member and responsive to temperature decrease of said bar to decrease the ratio of the metal flow rate to the peripheral speed of said endless member.

3. A continuous molding apparatus comprising a movable endless member having a peripheral channel, means forming a cover for said channel over a portion of its length, means for effecting continuous movement of said endless member, means for continuously introducing molten metal into one end of the covered portion of said channel, means for facilitating solidification of the molten metal while in said channel, and temperature sensitive means responsive to temperature increase of the solid bar emerging from the covered portion of said channel to decrease the peripheral speed of said endless member and responsive to temperature decrease of said bar to increase the peripheral speed of said endless member.

4. A continuous molding apparatus comprising a movable endless member having a peripheral channel, means forming a cover for said channel over a portion of its length, means for effecting continuous movement of said endless member, means for continuously introducing molten metal into one end of the covered portion of the said channel, means for facilitating solidification of the molten metal while in said channel, and temperature sensitive means responsive to temperature increase of the solid bar emerging from the covered portion of said channel to increase the metal flow rate and responsive to temperature decrease of said bar to decrease the metal flow rate.

WILLIAM R. WEBSTER.